No. 863,622. PATENTED AUG. 20, 1907.
C. MESSICK, Jr.
MOTOR VEHICLE.
APPLICATION FILED SEPT. 8, 1904.

WITNESSES:

INVENTOR
Charles Messick Jr.
BY
ATTORNEYS

UNITED STATES PATENT OFFICE.

CHARLES MESSICK, JR., OF HACKENSACK, NEW JERSEY.

MOTOR-VEHICLE.

No. 863,622.　　　　Specification of Letters Patent.　　　　Patented Aug. 20, 1907.

Application filed September 8, 1904. Serial No. 223,681.

*To all whom it may concern:*

Be it known that I, CHARLES MESSICK, Jr., a citizen of the United States, and a resident of Hackensack, in the county of Bergen and State of New Jersey, have invented a new and Improved Motor-Vehicle, of which the following is a full, clear, and exact description.

My invention relates to devices for operating a motor bicycle through the pedal mechanism.

The purpose of the invention is to provide a system of ball bearings for the driving and brake mechanism, whereby the said parts will operate with the least possible friction, and further to so construct the said mechanism that when going forward, the pedals turning for driving action, the braking section of the device will act concertedly with the source of power to drive the machine, whereupon, by back-pedaling or by means of a hand-controlled brake rod carried to an intermediate position between the driving sprocket at the pedal shaft and the brake surface on the frame of the machine, to permit of coasting, or whereby the braking section may be brought so firmly against the said braking surface of the frame as to bring the machine to a stand-still in a short period of time and without danger to the parts of the machine, and to incorporate in the braking section the sprocket at the pedal shaft utilized to transmit power to the rear or driving wheel of the machine.

A further purpose of the invention is to provide a spark-control for the motor, operated by back pedaling or by hand, which will reduce the speed of the motor more or less, or permit it to travel at full speed, which spark-control when placed in a position to drive the motor at low speed, will yet permit the motor to continue running while the brake section is in intermediate or coasting position, or in actual braking position.

Another purpose of the invention is to provide a mechanism of the character described, which will be comparatively simple, perfect and positive in its action, and exceedingly economic in its construction for a machine of its type.

Another purpose of the invention is to provide a spark-control co-acting with the brake, and to prevent the motor thereby from running away and shaking itself to pieces, practically acting as a governor.

A further purpose of my invention is to provide an eccentric for the motor chain adjustment and a joint close to this eccentric for accommodating the flexible movement of a cushion frame, and to provide a brake on the intermediate sprocket, also of novel design in that it operates only by back-pedaling or equivalent hand movement and normally makes driving contact between the motor-driven sprocket and the rear wheel driving sprocket.

Another purpose of my invention is to provide a latch, and means releasable by pedaling for maintaining the coasting or other positions of the device against the main spring.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all the figures.

Fig. 6 is a detail plan view of the improved mechanism.

Figure 1:
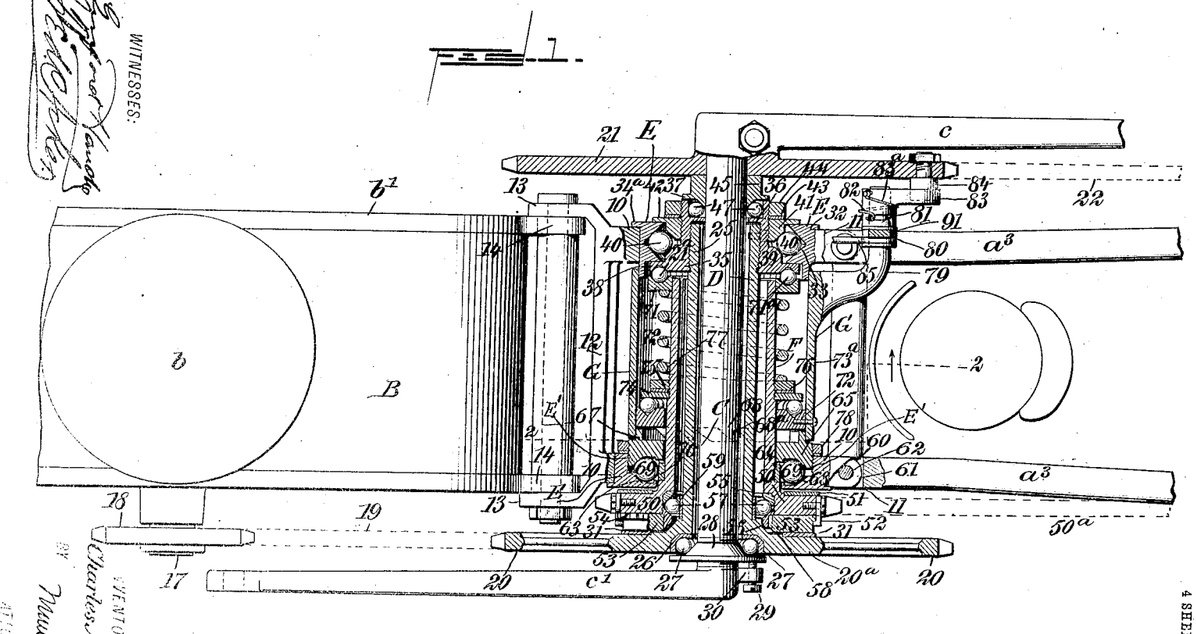
Figure 1 is a horizontal section through the driving and brake mechanism, the motor and a portion of the frame being shown in plan view.
Figure 2:
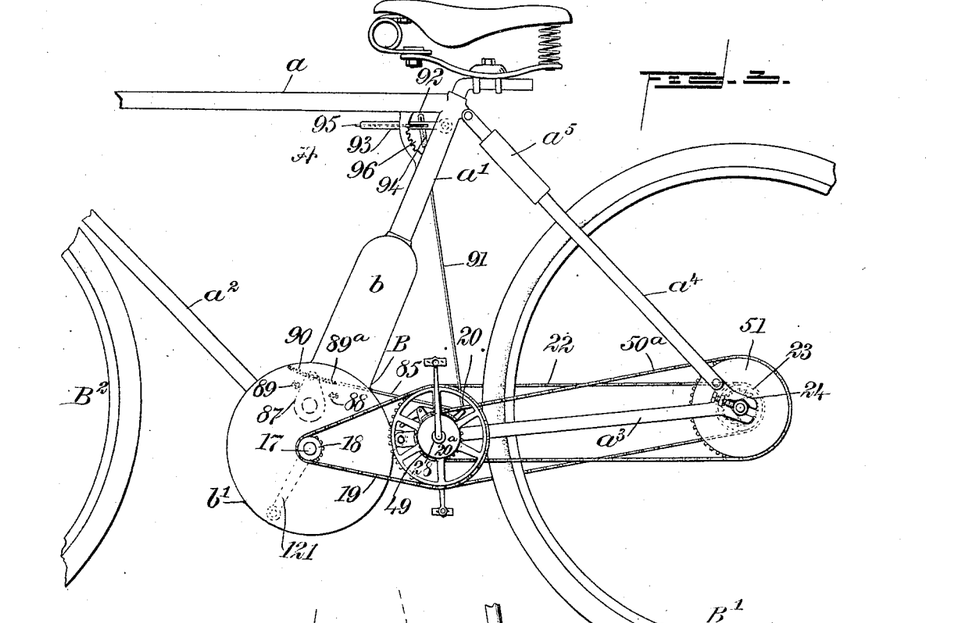
Fig. 2 is a longitudinal vertical section, taken practically on the line 2—2 of Fig. 1.

In Figs. 1, 2, 3 and 6 I have illustrated the application of my device to a motor bicycle in which the frame A of the machine consists in an upper brace or top tube $a$ and a center tube $a'$, with which the cylinder $b$ of the motor B is connected, the crank shell $b'$ of the motor being between the lower main brace $a^2$ and the rear lower braces $a^3$. In the further construction of the frame, the rear upper braces $a^4$ are connected with the central tube $a'$ by a spring coupling $a^5$, commonly known as a cushion frame, and the rear wheel B' and the forward wheel B² are mounted in the frame in the usual manner. In Figs. 2 and 6 I have illustrated an automatic method of employing brake notches.

At the forward ends of the rear lower braces $a^3$, rings 10 are formed, as is particularly shown in Fig. 2, and a slot 11 is made, which extends into the rear lower braces, as is shown in Figs. 1 and 2. A cross bar 12 connects the forward portions of the two rings 10, and from the ends of the cross bar 12 lugs 13 are forwardly projected, while from the rear of the crank shell $b'$ of the said motor lugs 14 are projected, and the motor is suspended with relation to the rear lower braces $a^3$ by means of a pin 15 and eccentric 16, shown best in Fig. 2, which eccentric passes through the said lugs 14. The eccentric 16 is employed in order that the driving chain 19 which passes over the sprocket wheel 18 on the driving shaft 17 of the motor may be tightened or loosened, the said chain 19 being passed over a larger driven sprocket wheel 20 at the left-hand side of the machine, and this sprocket wheel 20 is provided with a solid section 20ᵃ around its hub.

The pedal shaft C is journaled in bearings to be hereinafter described, within the central portion of the aforesaid rings 10, as is shown in Figs. 1 and 2. The usual crank arms $c$ and $c'$ carrying pedals, are secured to the outer ends of the pedal shaft C, and at the right-hand end of the said pedal shaft C a sprocket wheel 21 is located. The right-hand sprocket wheel 21 forms a portion of the pedal crank e, or is attached thereto.
This sprocket wheel 21 is brought into action when the machine is to be driven by means of the pedals, and to that end the said sprocket wheel 21 is connected by a chain 22 with a smaller sprocket 23 on the right-hand end of the axle for the rear wheel B', at which point a coasting ratchet 24 is located. D represents a sleeve, which forms an integral portion of the hub of the left-hand sprocket wheel 20, and the right-hand end of the said sleeve D extends practically to the outer right-hand side surface of the rear lower base member of the frame, as is shown in Fig. 1, and is provided at such point with an exterior screw 25.

Around the hub section of the sprocket wheel 20 a cup 26 of any suitable material is entered, forming a race for balls 27, and these balls are held in the race and have bearing against a cone 28, which is adjustable on the left-hand end of the pedal shaft C, and is held in position by a set screw 29, passed through a threaded lug 30, extending from the left-hand pedal arm, the said set screw being adapted to enter any one of a series of openings in the outer face of the aforesaid cone 28 as is best indicated in Fig. 1. Furthermore, in the construction of the left-hand driven sprocket 20 a ring 31 of a hard material, adapted for frictional engagement with a brake mechanism to be hereinafter described, is located upon the inner face of the solid portion 20ᵃ of the said wheel, as is also shown in Fig. 1.

A main bearing E is employed for the right-hand end portion of the sleeve D and the right-hand end portion of the pedal shaft C. As is shown in Fig. 1 the details of construction of this bearing E are as follows:

A ball race 32 is made to fit snugly in the right-hand ring 10, provided upon its inner face with a V-groove 33, and an external annular peripheral flange 34ᵃ is also employed, which has bearing against the outer face of the said right-hand ring 10. In connection with the outer ball race a main cone 35 is employed, which cone is interiorly threaded for a portion of its length, so that it can be screwed upon the threaded surface 25 of the sleeve D and pinned in place.
The cone 35 extends beyond the outer end of the sleeve D, and in front of the outer end of said sleeve D an annular flange 36 is formed in the said cone 35, through which flange the pedal shaft C is loosely passed, thus forming a pocket at the end of the said cone member 35 of the bearing E; and in the further construction of this cone member 35 an external peripheral flange 38 is produced at the inner face of the said member, which flange extends into that portion of the outer ball race member 32 surrounded by the flange 34.
Furthermore, in the construction of the inner cone member at its outer face, adjacent to the flange 38, a cone shoulder 39 is formed, having its outer corner more or less inclined, conforming practically to the inclination of a side of the V-groove 33 in the outer ball race member 32. Under this construction pockets are formed, in which balls 40 are located, and the pockets are closed and the balls held in position by screwing an adjustment cone member 41 on the exterior of the inner member 33 of the said bearing E, which
adjustment cone engages with the balls 40 and is pro-
vided with an outer annular flange 42. These pockets in which the balls are contained afford four points or bearings for the said balls and the adjustment cone member is prevented from possibly slipping or working from position by placing a lock-washer 43 over the outer exteriorly-threaded portion of the member 35, and then screwing a check nut 44 on the said member to an engagement with the said washer. The sleeve D is therefore free to rotate in the bearing E but is prevented from end movement thereby.

A cone bored to receive the right-hand end of the pedal shaft C is secured to the right-hand sprocket wheel 21, or is made integral therewith, and this cone is provided with a flange which extends over the pocket 37 at the right-hand end of the sleeve D, and in this pocket balls 47 are placed having three points of bearing, as is shown in Fig. 1. Thus it will be observed that both the right-hand ends of the pedal shaft and the sleeve D carrying the driven sprocket 20 are perfectly supported in ball bearings, which bearings may be quickly and conveniently assembled or taken apart as occasion may demand. The ball bearings E are held in position by tightening the rings 10 by means of a suitable bolt 49 passed downward through the said rear lower base aᵃ of the frame, the said bolt being provided with a suitable nut, as is shown in Fig. 2.

A second sleeve F is slipped loosely over the sleeve D from the left-hand side of the machine, but does not extend as far to the right as the sleeve D, stopping a short distance from the inner member 35 of the bearing E, as is shown in Fig. 1. At the left-hand end of the outer sleeve F the hub of a driving sprocket 50 is secured, or made integral therewith, and upon the inner or left-hand face of the sprocket 50 a braking ring 51 of very hard material is located. At the left-hand or outer face of the driving sprocket 50 an adjustment ring 53 for ball bearings 57 is located and held, which ring 53 is provided with a marginal recessed rib 54, exteriorly located at its inner face, as is shown in Fig. 1; and a ring 53 is secured to the sprocket 50 by spring clamps 52 attached to the sprocket between its teeth, as is also shown in Fig. 1. These spring clamps 52 are more or less L-shaped, and the members attached to the sprocket 50 extend through the recess in the rib 54 of the ring 23, while the other members engage with the outer face of the rib 54, thus preventing the ring 53 from moving from the sprocket 50 when once attached, but enabling a person to readily detach the ring when desired.

The outer sleeve F revolves upon ball bearings at its outer end portions, which bearings consist of a cone member 55 screwed into the hub of the sprocket 50 and an opposing similarly formed cone member 56, partly screwed in the said hub of the sprocket 50 and partly held by tongue and groove connection with the inner face of the adjustment ring 53, together with a hard ring 59 fixed on the sleeve D, thus forming a pocket in which balls 57 are free to turn, having three points of contact.
The outer end portion of the sleeve F carrying the driving sprocket 50 is supported by a ball bearing E', which ball bearing consists of a cone member 60, which is somewhat L-shaped in cross section, as is shown in Fig. 1, and this member 60 fits snugly in the left-hand ring 10 of the frame heretofore referred to, being secured in position by a suitable bolt 62. The member of the bearing cone 60 which is parallel with the sleeve F is interiorly threaded, and that member which is opposed to the brake ring 51 on the driving sprocket 50 is at right angles to the said sleeve F, as is also shown in Fig. 1, and is provided with an inclined shoulder 63. Opposite this shoulder 63 a band 64 of hard material is located upon the exterior of the sleeve F, and the ball bearing is completed by the addition of an adjustment cone 65, beveled at its inner portion the reverse of the bevel of the shoulder 63, and this member 65 is screwed into the member 60, and the balls 69 are placed in the pocket thus formed, which balls have three points of bearing.

The member 65 is provided with a lock washer and check nut 78. This member 65 at its right-hand face is provided with teeth 68 which are formed thereon, and said teeth 68 are straight on one side and are inclined at the opposite side, and a suitable space intervenes the opposing teeth. The inner end of the sleeve F is provided with a collar 71 loosely mounted thereon, and the opposing faces of the collar 71 and the inner portion of the inner member or shoulder 39 of the bearing E, are provided with opposing grooves, in which balls 71ª have movement, so that the said sleeve, when turned, has a ball bearing at its inner end.

A casing G is made to surround all the parts heretofore mentioned, located within the frame, as is shown in Figs. 1 and 2, and this casing G turns loosely on the flange 34 on the outer member 32 of the right-hand ball bearings E, and on a flange 67 formed on the inner face of the inner member 65 of the opposing main ball bearing E'. A ring 72 loosely surrounds the sleeve F, and this ring 72 is secured in any suitable or approved manner to the left-hand end portion of the shell G. A thrust disk 74 is screwed on the exterior of the outer sleeve F, and balls 73 are held between the said disk and the ring 72 fastened to the casing G, a suitable groove being provided in the said ring 72 for the said balls, and the disk 74 is held in position by a lock washer 75 located on the exterior of the sleeve F, and a check nut 76 is screwed on the said sleeve to an engagement with the washer.

At the outer or left-hand side face of the ring 72 teeth 68ª are formed, reversely inclined to the inclination of the teeth 68 heretofore mentioned, but being of corresponding formation, and the teeth 68ª are adapted to enter the spaces between the teeth 68 and the spaces between both sets of teeth are equal, so that there can be a certain amount of rotary movement on the part of the shell G before the teeth come in contact to ride one upon the other and force the said ring 72 carried by the shell G away from the ball bearings E', as will be hereinafter stated.

A spring 77 is loosely coiled around the said sleeve F, having bearing against the collar 71 at one end and against a nut 76 at the opposite end; and this spring is of sufficient strength to force the sleeve F outward to such an extent as to bring the adjustment ring 53 carried by the driving sprocket 50 in engagement with the friction ring 31 on the inner face of the driven sprocket 20, and thus by frictional contact, as the sprocket 20 is driven from the motor, motion is communicated to the sprocket 50, and through the medium of a chain 50ª motion is communicated to a sprocket wheel 51 on the left-hand end of the axle of the rear wheel B'. This frictional engagement between the driven sprocket 20 and the driving sprocket 50 is shown clearly in Fig. 1.

An angle arm 79 is carried out from the rear portion of the shell G at the right-hand side of the machine, and a sleeve 80 is mounted to turn on the said arm 79, the said sleeve 80 being provided with a circumferential slot 81; and a pin 82 is passed through the said slot into the arm 79, as is also shown in Fig. 1. At the outer end of the sleeve 81 a finger 83 extends rearwardly, having its outer end beveled, as is shown in Fig. 2, and a spring 83ª, is attached to the said sleeve and is then coiled around the same and attached to the said pin 82, as is shown in Fig. 1, the tendency of the said spring being normally to carry the finger 83 in an upward and more or less of a backward position. This finger 83 is adapted to be engaged by one or the other of two rollers 84 as is shown in Figs. 1 and 2, being placed diametrically opposite at the marginal portion of the inner face of the sprocket wheel 21.

Figure 3:
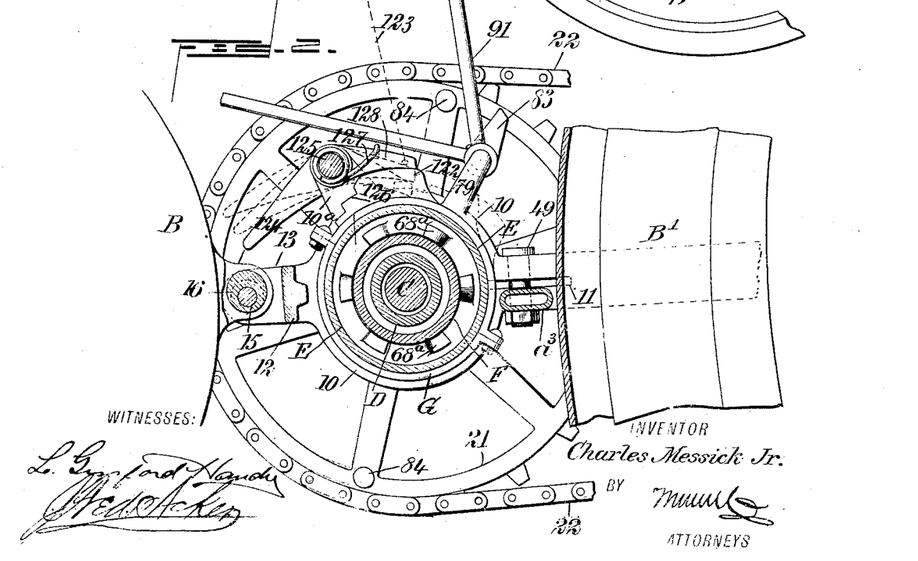
Fig. 3 is a side elevation of a portion of the machine, showing the device applied and the relative positions of the parts.

A rod 85 extends from the arm 79 near the sleeve 80 in a forward direction, and is connected by a spring 89ª with the sparker 87 of the motor B, as is shown in Fig. 3. This sparker 87 has movement between two posts 88 and 89, and when the sparker is in engagement with the post 89 the motor will run at full speed. When the sparker is at points between the two posts or stops, or is in engagement with the post or stop 88, the motor will run at reduced speed. A spring 90 connected with the sparking device 87 and with a point on the shell of the motor carries the said sparking device to its normal full speed position shown in Fig. 3. This connection is a control connection for the sparking device and likewise controls the movement of the driving sprocket 50, causing the said sprocket 50 to be brought into such position between the frame and the sprocket 20 as not to engage with either, thus permitting a person to coast; and at the same time the sparker being in engagement with the post 88 the motor will run at low speed and will continue to so run during the operation of coasting and subsequent operation if desired. If the arm 79 is carried further downward and further rearward tension is exerted on the rod 85, the braking ring 51 on the driving sprocket 50 will be brought into greater or less contact with the frame of the machine, and the machine will be stopped, and all connection between the motor and the driving wheel B' of the machine will be cut off, but the motor will still continue to operate at low speed, ready to exert its force the moment that the driving sprocket 50 is again brought into frictional contact with the driven sprocket 20.

These operations are accomplished as follows: While the machine is going ahead the rollers 84 on the sprocket wheel 21 will simply pass or click by the trip finger 83 on the sleeve 80 carried by the arm 79; but when it is desired to coast, back-pedaling is brought into play, and the direction of rotation of the sprocket wheel 21, acted upon by the pedals, will be reversed from the direction it travels in driving, and will strike the trip finger 83 and press it down, thus turning the sleeve 80 against the tension of the springs 89ª and 90, drawing the rod 85 backward and bringing the sparking device to a contact, if desired, with the low speed post 88. At the same time the sleeve G is revolved and the teeth 68ª on the ring 72 secured to the shell will at such time ride up the teeth 68 on the ball bearing e', and separate the shell from the said ball bearing to a sufficient extent, for example, to carry the outer sleeve F to which the ing sprocket 50 is attached inward, owing to the ...ring between the ring 72 and the disk 74 attached to the said sleeve, and the said driving sprocket will then be out of engagement with the driven sprocket 20 and the frame of the machine. If it is desired to stop the machine, back pedaling is further continued and the sleeve F is carried further inward, effecting a braking connection between the sprocket 50 and the frame of the machine, the motor still continuing in operation. If it is simply desired to lower speed, back-pedaling is again resorted to, but very lightly, and the sleeve 80 will be carried back sufficiently only to cause the teeth 68$^a$ to travel the distance between the teeth 68. These teeth are indicated by dotted lines in Fig. 1. The same operation may be produced by hand as has been ascribed to back-pedaling, and this result is accomplished by hand through the medium of a rod 91, which extends upward to the central tube $a'$ and is provided at its upper end with a loose cap, a spring 94 being located within the cap, engaging with the upper end of a rod 91. A hand lever 93 is fulcrumed on the central tube $a'$, and this rod has a pin which passes through a slot in the cap 92 in engagement with the upper end of the spring 94; and a spring-controlled thumb latch 95 operates in or upon the lever 93 and engages with notches 96 in a segment which is attached to the upper bar of the frame adjacent to the seat and the central post $a'$. By pushing the lever 93 downward more or less, the sleeve 80 is forced to revolve more or less downwardly and forwardly, to bring about first a slow movement of the motor, next a movement of the braking and driving mechanism for coasting, and finally an absolute braking action, or any points between said actions, the lever being held in the adjusted position by the aforesaid latch and rack.

Referring to Fig. 2, lugs 10$^a$ are formed on the rings 10, and a pin 123 is passed through these lugs, on which pin a ratchet 125 is mounted. This ratchet is made to be normally kept in engagement with teeth 126 on the shell G by a spring 127, and a tongue 124 is attached to the ratchet 128 and mounted with it on a pin 125. By pedaling, the roller 84 pushes down the tongue 124, the ratchet is raised and thus permits the springs in the brake mechanism to connect with the friction clutch and make the motor connect with the rear bicycle wheel and function, as previously described. The teeth 126 are of different heights, so that different pressure on the tongue 124 will successively let the teeth 126 pass and release the brake, bringing the mechanism in coasting position and further pressure will restore the mechanism to full-speed position. This mechanism is to place the bicycle control totally with the pedals.

Figure 4:
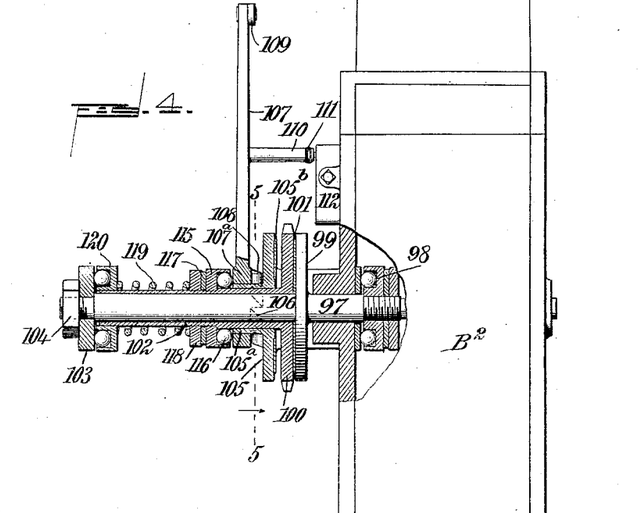
Fig. 4 is a sectional view, showing the device as applied to an automobile motor.

The lug 122 is higher than the teeth 126, so that in full-speed driving position the tongue 24 is depressed and does not engage with the rollers 84. The numeral 123 in Fig. 2 indicates a cable, chain or link connected with the ratchet 128, indicating a method of lifting the latch by hand. This mechanism may or may not be used in connection with other control In Figs. 4 and 5 I have illustrated the adaptation of the improvement to the motor of any motor vehicle as distinguished from a bicycle. The drive shaft 97 of the motor is shown provided with thrust bearings 98 within the motor casing, and a disk 99 is secured on the drive shaft of the motor outside of its casing, as is shown in Fig. 4; and a driving sprocket 100 is loosely mounted on the said drive shaft 97 in front of the disk 99, the driving sprocket being provided with an ordinary inner face 101, which when the said sprocket is to be driven engages with the said disk 99, the driving being by frictional contact, as is also illustrated in Fig. 4. The sprocket 100 is provided with a sleeve 102, extending outward from its hub and fitting loosely upon the drive shaft 97. This sleeve at its outer end approaches a block 103, held upon the reduced outer end of the shaft 97 by means of a suitable nut 104, as is also shown in Fig. 4. A yoke 105 is secured to the face of the motor casing through which the shaft 97 extends, and this yoke is provided with a suitable opening through which not only the shaft 97 is carried but likewise the sleeve 102 of the driving sprocket 101, as this driving sprocket 101 is between the inner face of the said yoke 105 and the disk 99. The yoke 105 is provided with an outwardly-extending collar 105$^a$, through which collar the sleeve of the sprocket 100 is loosely passed; and the said yoke 105 at its inner central portion is provided with a hard metal cover 105$^b$. In the operation of this form of the device, when the driving sprocket 100 is in engagement with the disk 99 secured on the shaft 97 the sprocket 100 turns with the shaft. When the sprocket 100 is out of engagement with both the disk 99 and the yoke 105, the machine is in condition for coasting, and when the driving sprocket 100 engages with the inner face of the yoke 105, the driving sprocket is in braking contact with the said yoke.

Teeth 106 are formed upon the outer face of the yoke 105, the said teeth being radially disposed around the collar 105$^a$, and these teeth are provided with one inclined face and an opposing straight face. These teeth 106 are adapted to be engaged by teeth 108 reversely inclined, the spaces between the two sets of teeth being equal. The teeth 108 are secured upon the inner face of the lower portion 107$^a$ of a lever 107, which lower portion 107$^a$ of the lever is mounted to turn on the collar 105$^a$ of the yoke 105.

Figure 5:
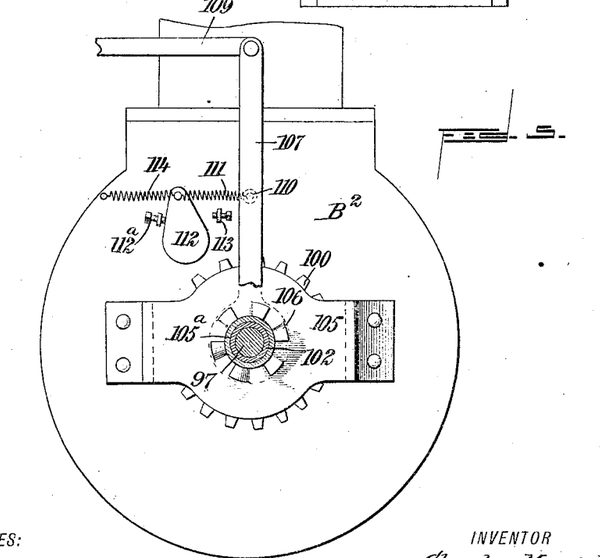
Fig. 5 is a section taken substantially on the line 5—5 of Fig. 4.

The lever 107 may be operated in any suitable or approved manner by the rider of the vehicle, as for example through the medium of a link 109, having suitable connections extending upward within convenient reach of the rider. A stud 110 is located at the inner face of the lever 107, and a spring 111 is attached to said stud and to the sparking device 112, or device for igniting the charge in the motor as is best shown in Fig. 5, the said device 112 having movement between stops 112$^a$ and 113; and when the said device 112 is in engagement with the stop 112$^a$ the motor is capable of running at full speed, and when said device 112 is in engagement with the stop 113 the motor is slowed down to such an extent that the crank will just pass the dead center. A spring 114 attached to the casing of the motor and to the sparking device 112, serves to draw the said sparking device to its normal position in engagement with the stop 112$^a$ when the lever 107 is in its normal position.

A ball cup 115, carrying balls 116 is screwed or otherwise secured on the sleeve extension 102 from the driving sprocket 100, and the balls engage with the outer face of the pivoted portion 107ᵃ of the lever 107. In order that this ball cup shall not work loose, a washer 117 is made to engage therewith, and a lock nut 118 is screwed on the sleeve 102 to a firm engagement with the washer. A spring 119 engages with the lock nut 118 at one end, and this spring is coiled around the outer end portion of the sleeve 102 of the said sprocket 100 and engages at its outer end with ball bearings 120, the balls of which engage with the block 103, as is shown in Fig. 4.

When the lever 107 is in its normal position shown, the teeth 106 will be in the space between the teeth 108, and the spring 119 will hold the sprocket wheel 100 against the disk 99 on said drive shaft 97. When the lever 107 is carried forward or backward as the case may be to a certain extent, the teeth 108 will ride upon the teeth 106 and the pivoted end of the lever will then be made to press outward against the ball bearing 115, and will cause the sprocket wheel 100 for example, to take an intermediate position between the yoke 105 and the disk 99; and if the lever 107 is carried further in the same direction, the sprocket 100 is brought into braking engagement with the hard inner surface 105ᵇ of the yoke 105, and no matter how the sprocket 100 is adjusted the motor still continues to operate but at a reduced rate of speed, as when the lever 107 is operated to shift the sprocket 100 the lever will carry the sparking device 112 over to an engagement with the stop 113.

Thus it will be observed, the sparking device in the vehicle and the clutch are controlled by a single lever, the latter control being that shown in Figs. 4 and 5, the purpose of which is to prevent the motor from running away when not driving.

The parts of the device shown in Fig. 1 may be readily removed from the frame of the machine, it being simply necessary to remove the cotter pin which connects the pedal c and sprocket 21 and the attached cone 45 from the pedal shaft C, whereupon the pedal shaft may be quickly removed. Then the outer portion, namely, the member 41 of the right-hand bearing E is removed and the screw 60 loosened, whereupon the shell and all the parts inclosed therein may be readily withdrawn from the frame and all of the parts separated and readily put together again after cleaning or for repairs.

In operation, if the machine is to be started by the pedals with the motor at rest, the action is that of an ordinary motor bicycle, but preferably the bicycle is started almost directly through the medium of the motor. The motor will be started while the bicycle is leaning against a tree or other convenient support by the crank 121. The rider will now mount the bicycle and will simply steady himself by using the pedals for a moment, and will then release the hand-shifting device and permit the controlling spring of the mechanism to throw the driving sprocket of the device in direct communication with the motor.

The control of the machine will now be wholly with the pedals. The rider rides and approaches a place where it is desirable to slow down; he back-pedals lightly, thus slowing the motor. Approaching a place where it is desirable to ride more slowly he back-pedals moderately and coasts; approaching a place where it is desirable to ride even more slowly he back-pedals harder, applying the brake and thus reducing the speed so that further reduction becomes impossible because equilibrium can no longer be maintained. Starting ahead again rapidly by pedaling slightly, he approaches a place at which he desires to stop for a moment; he pushes down the hand-controller to the coasting notch, thus nearing the stopping place with the motor running but not driving the rear wheel. The machine is now ridden as a bicycle with a coaster brake. He dismounts and pushes down the hand-control lever still further, thus applying the brake and locking the rear wheel so that when the bicycle is leaned against a convenient support the vibration of the running motor will not make the bicycle move and fall down on its side.

It will be noted that the hand-controller may be placed in any intermediate position, thus preventing the motor from running at its full speed while the pedals control only the slower speeds, coasting and braking. Although the pedals may control all operations in riding, their chief functions are to disconnect the motor from the rear bicycle wheel and to apply a coaster brake. The pedal control of the sparking device is chiefly useful as a governor. The sparking device is taken as the typical control-means of the motor, but it may be desirable to combine with the control of the sparking device that of the carbureter, throttle, &c., or eliminate some of these.

It should be clearly understood that the above means of controlling the motor may be varied. For instance, the control-means applicable to an internal, spontaneous combustion ignition motor, such as is described in a patent application by me of a recent date.

While I have not described a typical governor as applied to motor bicycles, yet it may be necessary to apply some well-known form in the place of the pedal governor connection shown. The thrust cam for shifting the sprocket and driving the rear wheel may be of any approved form other than that described.

It should also be noted that the sparking device may be forced against the springs normally controlling its movements.

Any or all of the devices known as useful on motor bicycles may be used in combination with my invention.

I do not confine myself to the exact mechanism shown, but may vary it in accordance with experience and the progress of the art.

Having thus described my invention, I claim as new, and desire to secure by Letters Patent;—

1. In a motor vehicle, a motor, a sparking device for the motor, stops between which the sparking device has movement, one stop indicating full speed and the other stop low speed, a shifting driving sprocket, means for driving said sprocket from the motor, and devices for disconnecting the sprocket from the motor and simultaneously bringing the sparking device in position to reduce the speed of the motor.

2. In motor vehicles, a bicycle, a motor carried by the bicycle, a device for igniting the charge in the motor, a shifting driving sprocket for the bicycle, operated from the motor, and a shifting mechanism for the igniting device and the driving sprocket, acting simultaneously on both, bringing the motor to low speed and disconnecting the driving sprocket from the motor without interfering with the action of the motor.

3. In motor vehicles, a bicycle, a motor carried thereby, a device for igniting the charge in the motor, a driving sprocket driven from the motor and connected with the driving wheel of the vehicle, and a shifting mechanism for the driving sprocket, driven from the motor and connected with the driving wheel of the vehicle, and a shifting mechanism for the driving sprocket, arranged to make and break driving connection between the said sprocket and the motor and for controlling the igniting device.

4. In motor vehicles, a bicycle, a motor carried thereby, a device for igniting the charge in the motor, a driving sprocket driven from the motor and connected with the driving wheel of the vehicle, a shifting mechanism for the driving sprocket, arranged to make and break driving connection between the said sprocket and the motor and for controlling the igniting device, and means for locking the shifting mechanism in predetermined position, said shifting mechanism causing the motor to run at low speed when connection between the motor and the driving sprocket is severed.

5. In motor vehicles, a bicycle and a motor carried thereby, a device for igniting the charge in the motor, a driving sprocket driven from the motor and connected with the driving wheel of the vehicle, and a shifting mechanism for the driving sprocket, arranged to make and break driving connection between said sprocket and the motor, means for locking the shifting mechanism in predetermined position, said shifting mechanism causing the motor to run at low speed when connection between the motor and the driving sprocket is severed, a braking surface upon the driving sprocket, adapted when said sprocket is shifted inward to its full extent to have braking engagement with the frame, and a spring-controlled sliding support for the driving sprocket, which when the shifting mechanism is not applied carries the said sprocket in driven connection with the motor.

6. In a motor vehicle, a frame, a motor carried by the frame, a sparking device for the motor, a pedal shaft, roller bearings for the pedal shaft, a gear attached to one end of the pedal shaft, a gear loosely mounted at the opposite end of said pedal shaft, a connection between the latter gear and the motor, and a connection between the fixed gear and the gear on the driving wheel of the machine, roller bearings for the gear, connected with the motor, the said gear being provided with a sleeve through which the pedal shaft is loosely passed, roller bearings for the inner end of the said sleeve, a spring-controlled outer sleeve loosely carried over the inner sleeve, roller bearings for the said outer sleeve, a driving sprocket located at the end of the outer sleeve adjacent to the gear coupled with the motor, said driving sprocket being connected with the driving wheel of the machine and being capable of movement with its sleeve to and from the said gear coupled with the motor and the frame of the machine to engage with either or to occupy a position intermediate of them, a shell mounted to turn around the outer spring-controlled sleeve, a ring carried by the said shell through which the said outer sleeve passes, teeth on the said ring, and teeth carried by a ring extension of the outer sleeve, coöperating with the teeth carried by the shell, an arm extending from the shell, a spring-controlled sleeve having rocking motion on the arm, a finger extending from the said sleeve, a connection between said sleeve and the sparking device, said connection being partially a spring connection, and trips on the gear fast to the pedal shaft, which trips act on the said finger in back-pedaling to carry the driving sprocket away from the gear driven by the motor.

7. In a motor bicycle, a frame, a motor carried by the frame, a sparking device for the motor, a pedal shaft, roller bearings for the pedal shaft, a gear attached at one end of the pedal shaft, a gear loosely mounted at the opposite end of the said pedal shaft, a connection between the latter gear and the motor and a connection between the fixed gear and the gear on the driving wheel of the machine, roller bearings for the gear connected with the motor, the said gear being provided with a sleeve through which the pedal shaft is loosely passed, roller bearings for the inner end of such sleeve, a spring-controlled outer sleeve loosely carried over the inner sleeve, roller bearings for the said outer sleeve, a driving sprocket located at an end of the outer sleeve adjacent to the gear coupled with the motor, the said driving sprocket being connected with the driving wheel of the machine and being capable of movement with its sleeve to and from the said gear coupled with the motor and the frame of the machine, to engage with either or to occupy a position intermediate of them, a shell mounted to turn around the outer spring-controlled sleeve, a ring carried by the said shell, through which the said outer sleeve passes, teeth on the said ring, and teeth carried by a ring extension of the outer sleeve, coöperating with the teeth carried by the shell, an arm extending from the shell, a spring controlled sleeve having rocking motion on the arm, a finger extending from the said sleeve, a connection between the said sleeve and the sparking device, said connection being partially a spring connection, and trips on the gear fast to the pedal shaft, which trips act on the said finger in back-pedaling to carry the driving sprocket away from the gear driven by the motor, a bar extending upward from the said spring-controlled sleeve, a rack carried by the frame of the machine, and a latch lever pivoted on the frame, having compressing action on the said rod and adapted for engagement with the said rack, whereby to operate the sparking device and the driving sprocket by hand.

8. In motor vehicles, a motor, a driving device driven by the motor, said driving device being held in driving relation with the motor by a spring, and means for overcoming this spring and bringing the driving device at the will of the operator in successive positions, driving, coasting, braking and intermediate.

9. In motor vehicles, a motor, control means for the motor, a driving device driven by the motor, a spring to maintain driving engagement with the motor, and means for overcoming this spring and successively producing driving, coasting and braking positions of said driving means by a single control means.

10. In a motor vehicle, a motor, a control device for the motor, a spring to maintain a friction clutch in engagement, and a control lever to overcome the spring and make it disengage from the friction clutch and by movement of the pedals to effect successively coasting and braking.

11. In a motor bicycle, a spring-maintained friction clutch, an intermediate sprocket having a laterally movable member, and means for overcoming the spring and successively bringing the laterally movable member of the intermediate sprocket in a coasting position and a braking position in frictional contact with the bicycle frame.

12. In a motor bicycle, a spring-maintained friction clutch, a laterally-movable motor driven sprocket, means for disengaging the sprocket from the motor drive, and means for successively bringing the said sprocket in two distinct successive positions, the first a coasting position and the second a braking position.

13. In a motor bicycle, an intermediate sprocket driven by the motor, a second intermediate sprocket connected to the rear bicycle wheel by a chain, a spring to maintain the connection between the two intermediate sprockets, and means for overcoming the spring and for shifting the second intermediate sprocket into braking contact with the bicycle frame.

14. A motor bicycle having a spring-maintained friction driving device, a spring to maintain the same, and means for overcoming the spring and applying a brake while the spring is opposing the application of the same.

15. In a motor bicycle, a coaster brake, a cushion frame, and a hinge joint on the lower rear forks of the bicycle combined with an eccentric motor chain adjustment close to said joint.

16. In a motor bicycle, a friction clutch, a coaster brake and an eccentric motor chain adjustment near the motor.

17. In a motor bicycle, a governor for the motor, coasting pedals and a cushion frame.

18. In a motor bicycle, a governor for the motor, a friction clutch and brake, a device to shift the same, and a cushion frame.

19. In a motor bicycle, a shiftable rear wheel driving intermediate sprocket, a thrust cam to shift said sprocket, a spring to oppose said thrust cam, and means for operating said thrust cam from the pedals by back-pedaling. 160

20. In a motor bicycle, a shiftable rear wheel driving intermediate sprocket, a thrust cam to shift said sprocket, and means under the control of the rider to operate the same, and a spring to oppose said thrust cam movement.

21. In a motor bicycle, a shiftable intermediate sprocket, means controlled by the pedals to operate said sprocket, comprising a thrust cam and connections to the pedals, a latch to maintain said thrust cam in any position in which it is placed by back-pedaling, and means to release said latch.

22. In a motor bicycle, a first intermediate sprocket driven by the motor, a second intermediate sprocket driven by the first intermediate sprocket, a spring-maintained frictional engagement between the two factors, coasting pedals for releasing said frictional engagement by backward pedaling and producing successive coasting and braking positions of the same, a braking surface on the bicycle frame, an eccentric to adjust the motor chain, a hinge near the same for accommodating the movements of a cushion frame, and means releasable by pedaling to prevent the functioning of the aforementioned spring.

23. In a motor bicycle, a first intermediate sprocket driven by the motor, a second intermediate sprocket driven by the first intermediate sprocket, a spring-maintained frictional engagement between the two factors, coasting pedals for releasing said frictional engagement by backward pedaling and producing successive coasting and braking positions of the same, a braking surface on the bicycle frame, an eccentric to adjust the motor chain, and means releasable by pedaling to stop the functioning of the aforementioned spring.

24. In a motor bicycle, a first intermediate sprocket driven by the motor, a second intermediate sprocket driven by the first intermediate sprocket through spring-maintained frictional engagement, coasting pedals for releasing said frictional engagement by backward pedaling and producing successive coasting and braking positions of the same, a braking surface on the bicycle frame, an eccentric to adjust the motor chain, and a hinge near the same for accommodating the movements of a cushion frame.

25. In a motor bicycle, a first intermediate sprocket, driven by the motor, a second intermediate sprocket driven by the first intermediate sprocket through spring-maintained frictional engagement, coasting pedals for releasing said frictional engagement by backward pedaling and producing successive coasting and braking positions of the same, a braking surface on the bicycle frame, and an eccentric to adjust the motor chain.

26. In a motor bicycle, a motor carrying a gear, a rear driving-wheel gear driven from the motor gear, and a mechanism controlled by the movement of the pedals and located at an intermediate position between the motor and the rear driving wheel gear, for disengaging the motor from driving relation with the rear wheel.

27. In a motor vehicle, a motor, a controlling device for the motor, a rear wheel driving sprocket driven by the motor, a device intermediate of the motor and the rear wheel driving sprocket and which disconnects the said sprocket from the motor and takes successive positions, the motor-driven position, the coasting position and the position in which the driving device acts as a brake because of its frictional engagement with the stationary part of the vehicle.

28. In motor vehicles, a motor, a governor for the motor, a driving device capable of three successive positions, first the vehicle as driven by the motor, second the vehicle coasting and the motor running free, and third the vehicle being braked by the driving device making frictional contact with the vehicle frame, the motor running free.

29. In a motor bicycle, a spring-maintained friction clutch intermediate between the motor and a driving wheel, and means for overcoming the pressure of the spring.

30. A motor bicycle provided with a first intermediate sprocket driven by the motor, a second intermediate sprocket concentric with the first-named intermediate sprocket, a connection between the said second intermediate sprocket and the rear bicycle wheel, and means for moving the second intermediate sprocket from engagement with the first intermediate sprocket to an engagement with the frame for braking purposes.

31. A motor bicycle provided with a first intermediate sprocket driven by the motor, a second intermediate sprocket concentric with the first intermediate sprocket, a chain connection between the second intermediate sprocket and the rear bicycle wheel, means for disconnecting the second intermediate sprocket from engagement with the first intermediate sprocket, and a coaster brake operated through the medium of the said latter-named mechanism.

32. In a motor bicycle, a friction clutch, a coaster brake, means for regulating the speed of the motor by regulating the timing of the spark, a lever which performs the double function of disengaging the clutch and applying the brake, the movement of the said lever retarding the sparking device and serving to slow the motor simultaneously with disengaging the friction clutch.

33. In a motor vehicle, a device driven by the motor, means for placing said device in any one of three positions, driving, coasting or braking, a tension member to hold the device in one position, and means under the control if the operator for overcoming said tension member.

34. In a motor vehicle, a motor, an adjustable sparking device for the motor adapted to regulate the timing of the explosions in the motor, means for disconnecting the motor from the vehicle driving wheel, and connections between said sparking device and said disconnecting means, which connections include elements enabling the operator in disconnecting the motor from driving connection with the vehicle to also retard the sparking device and slow the motor.

35. In a motor vehicle, a motor, a clutch to transmit power from the motor to the rear wheel, a spring to maintain such clutch in a predetermined position, and means under the control of the operator for overcoming said spring.

36. In a motor vehicle, a friction clutch located on an intermedate axle, a driving chain connecting one of the clutch members with the motor of the vehicle, a driving chain connection between the other of the clutch members and the rear wheel of the vehicle, and means controllable by the rider for operating the clutch.

37. In a motor vehicle, a combined friction clutch and brake located at an intermediate position between the motor and a driving wheel of the vehicle, a spring to maintain the clutch and brake in desired position, and means controllable by the operator for overcoming the said spring.

38. In motor bicycles, an intermediate sprocket, a friction clutch, a coaster brake, a motor chain and an eccentric for adjusting the motor chain, said eccentric being located near the rear of the motor fly-wheel casing and near the forward end of the lower rear forks of the bicycle, all arranged for operation as set forth.

39. In a motor vehicle, a shiftable rear-wheel-driving intermediate sprocket, a thrust cam to shift the said sprocket, and means under the control of the rider to operate said thrust cam.

40. In a motor bicycle, the motor, the rear driving sprocket and pedals, a coaster brake, and a device intermediate between the motor and rear driving sprocket, arranged to disconnect the motor from driving relation to the bicycle, and connections to the pedal from said device, adapted to cause the device to disconnect the motor by back-pedaling and bring about the application of the brake.

41. In a motor bicycle, a clutch device, a coaster brake and a stop carried by the clutch device, which stop acts to maintain the clutch in a position to which it may be moved by back-pedaling, as set forth.

42. In a motor bicycle, a clutch device provided with a ball bearing having one cylindrical member, said cylindrical member being adapted to move lengthwise without changing the adjustment of the bearing.

43. In a motor vehicle, a clutch device having a roller bearing composed of a single cylindrical member, said cylindrical member being adapted to move lengthwise without changing the adjustment of the bearing.

44. In a motor bicycle, a clutch device, a coaster brake, a stop connected with the clutch, said stop being adapted to maintain said clutch in a set position, a latch for the said stop, and means controllable by the operator for releasing the latch.

45. In a motor bicycle, a motor, a control device for the motor, a coaster brake, a clutch, an intermediate sprocket driven by the motor, a chain connection between the said sprocket and the rear wheel of the vehicle, the said motor being in a position close to the pedal and in front of the rear driving wheel.

46. In a motor bicycle, a motor carrying a gear, a rear wheel driving gear driven from the motor gear, and a mechanism controlled by the movement of the pedal and located at an intermediate position between the motor axle and the rear driving wheel gear for disengaging the motor from driving relation with the rear wheel.

47. In a motor bicycle, a motor carrying a gear, a rear wheel driving gear driven from the motor gear, and a mechanism controlled by the rider and located intermediate between the motor axle and the rear driving wheel gear for disengaging the motor from driving relation with the rear wheel.

48. In a motor bicycle, a spring-maintained friction clutch intermediate between the motor axle and the driving wheel, and means for over-coming the pressure of the spring.

49. In a motor bicycle, a friction clutch with its two friction members normally held in frictional engagement by means independent of the rider, and means under the control of the rider for disengaging the friction clutch.

50. In a motor bicycle, a device driven by the motor, means for placing said device in any one of three positions, driving, coasting or braking, mechanical means to hold said device in one position, and means under the control of the operator for changing the position of said device.

51. In a motor vehicle, a motor, a control device for the motor, a clutch to transmit power from the motor to the rear wheel, a spring to maintain said clutch in a predetermined position, and means under the control of the operator for overcoming said maintaining means.

52. In a motor bicycle, a motor, a controlling device for the motor, a clutch to transmit power from the motor to the rear wheel, and maintaining means for said clutch, to hold it in a predetermined position, and means under the control of the operator for overcoming such maintaining means.

53. In motor bicycles, an intermediate sprocket, a friction clutch, a coaster brake, a motor chain, and an eccentric for adjusting the motor chain, said eccentric being located near the motor fly-wheel casing and forward of the lower rear fork of the bicycle.

54. In a motor bicycle, a motor, a rear driving sprocket and pedals, a coaster brake, and a device intermediate between the motor axle and the rear driving sprocket, arranged to disconnect the motor from driving relation with the bicycle, and connections to the pedals from said device, adapted to cause it to function by back-pedaling by the rider.

55. In a motor bicycle, a clutch device provided with a bearing having one cylindrical member located forward of the rear bicycle wheel, adapted for lateral movement without changing the adjustment of the bearing.

56. In a motor bicycle, a motor with an axle, a rear bicycle wheel carrying a driving sprocket, chains to transmit power to said rear bicycle wheel driving sprocket from said motor through its axle, and a clutch device adapted to prevent the chain-transmitting from said axle to said rear wheel driving sprocket when such clutch is drawn out of driving relation periodically by the operator.

57. A motor bicycle, with a clutch and an adjustment device to tighten the chain driving from the motor to the intermediate sprocket.

58. In a motor bicycle, a motor, a cushion frame, a sprocket on the motor shaft, an intermediate sprocket driven from the motor sprocket by a chain, a second intermediate sprocket concentric with and driven by the aforementioned intermediate sprocket, the said intermediate sprocket being in driving connection with a sprocket on the rear bicycle wheel, substantially as described.

59. In a motor bicycle, a clutch adapted to engage and disengage the motor from driving relation with the bicycle, the said clutch being located forward of the rear wheel driving sprocket, the said rear wheel driving sprocket being rigidly attached to the rear wheel, said rear wheel being mounted upon suitable ball bearings of approved motor cycle rear wheel hub design.

60. In a clutch-driven motor bicycle, a clutch controlled stop to be set by back pedaling and released by forward pedaling, and a coaster brake.

61. In a motor bicycle, a combined friction clutch and brake integral with the intermediate sprocket.

62. In a motor bicycle, a motor from which power is transmitted to the rear wheel through a friction clutch, and means for controlling the friction clutch by the pedals.

63. In a motor bicycle, a clutch device, a coaster brake, and a stop carried by the clutch device, which stop acts to maintain the clutch in the position to which it may be moved by back pedaling.

64. In a motor bicycle, a spring maintained friction clutch, and means under the control of the rider for releasing the same.

65. In a motor bicycle, a motor carrying a rigidly coupled pinion, a spring maintained friction clutch to transmit power from said pinion to the driving wheel, said clutch being releasable by the rider's foot power, a foot power brake, and means to prevent the simultaneous application of the clutch and brake.

66. In a motor bicycle, a spring maintained friction clutch, and means for releasing the clutch by the rider's foot power.

67. In a motor bicycle, a friction clutch having a spiral spring concentric with same to apply the clutch, said spring being rotatable with the clutch when it is in driving position and applying the spring pressure independently of stationary parts of the bicycle, and means under control by foot power of the rider for releasing the clutch.

68. In a motor bicycle, a motor, a friction clutch for transmitting power from the motor to the rear wheel, means for maintaining the clutch in a predetermined position, means for releasing said maintaining means, and means for controlling the friction clutch by the pedals.

In testimony whereof I have signed my name to this specification in the presence of two subscribing witnesses.

CHARLES MESSICK, Jr.

Witnesses:
J. FRED. ACKER,
JNO. M. RITTER.